United States Patent [19]
LaBenz

[11] 4,444,221
[45] Apr. 24, 1984

[54] SEWER MANHOLE CHANNEL CONSTRUCTION AND METHOD

[76] Inventor: Gary F. LaBenz, 13027 Dixie Highway, Holly, Mich. 48442

[21] Appl. No.: 379,212

[22] Filed: May 17, 1982

Related U.S. Application Data

[63] Continuation of Ser. No. 129,362, Mar. 11, 1980, Pat. No. 4,341,236.

[51] Int. Cl.³ .............................. F16L 5/00; E04B 2/00
[52] U.S. Cl. ......................................... 137/363; 52/20; 52/440; 52/577
[58] Field of Search .................. 52/20, 577, 324, 440; 137/363

[56] References Cited

U.S. PATENT DOCUMENTS

| 1,582,191 | 4/1926 | Snooke | 137/363 |
| 4,128,975 | 12/1978 | Abate | 52/577 |

FOREIGN PATENT DOCUMENTS

| 664863 | 9/1929 | France | 52/577 |
| 164100 | 1/1979 | Switzerland | 52/440 |

*Primary Examiner*—A. Michael Chambers
*Attorney, Agent, or Firm*—Cullen, Sloman, Cantor, Grauer, Scott & Rutherford

[57] ABSTRACT

In a sewer manhole construction having a cylindrical bottom section adapted for placement within the ground at a pre-determined depth and having bottom and side walls, there being spaced inlet and outlet openings in the side wall above the bottom wall adapted to receive the ends of sewer conduits. The improvement which comprises a flooring upon the bottom wall including a plurality of pre-formed filler channel elements of polygonal shape and of uniform height which are mounted upon and around the bottom wall adjacent the side wall. Adjacent inner walls and opposing walls of the filler channel elements define a first channel which underlies and interconnects the inlet and outlet openings. Each channel element has a plurality of upright apertures therethrough. A layer of concrete fills the apertures and interstices between the channel elements and between the channel elements and side wall partly fills the first channel and overlies the channel elements extending the floor above the channel elements. A concave floor channel is formed in the top of the concrete flooring in vertical registry with the first channel and at its ends communicating with the inlet and outlet openings.

7 Claims, 17 Drawing Figures

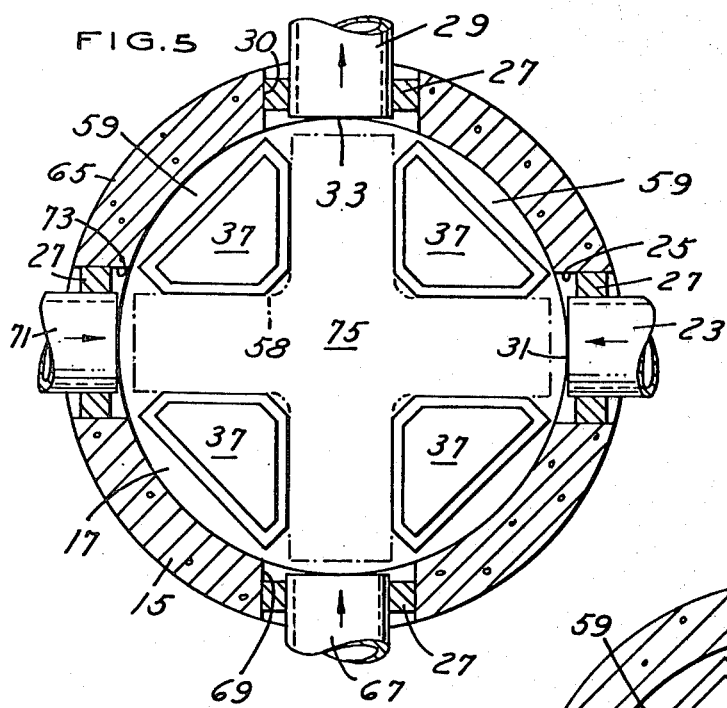
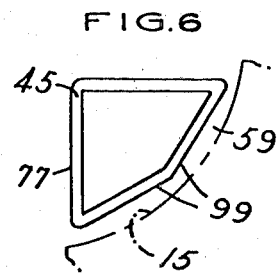
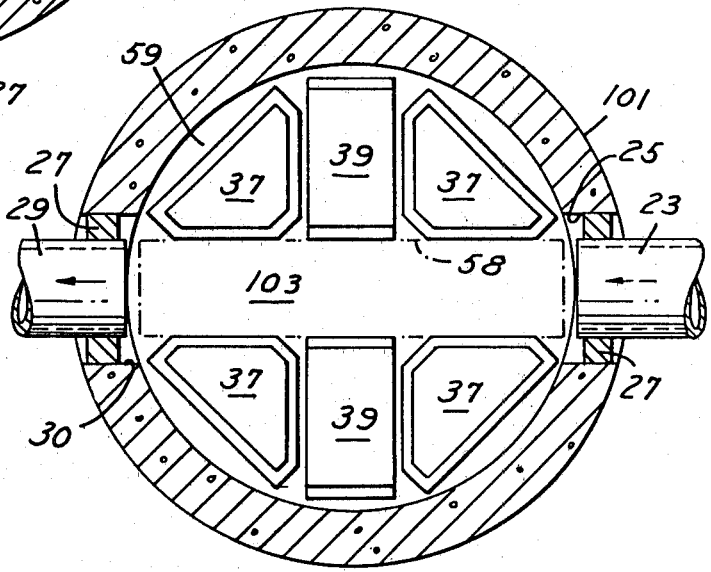
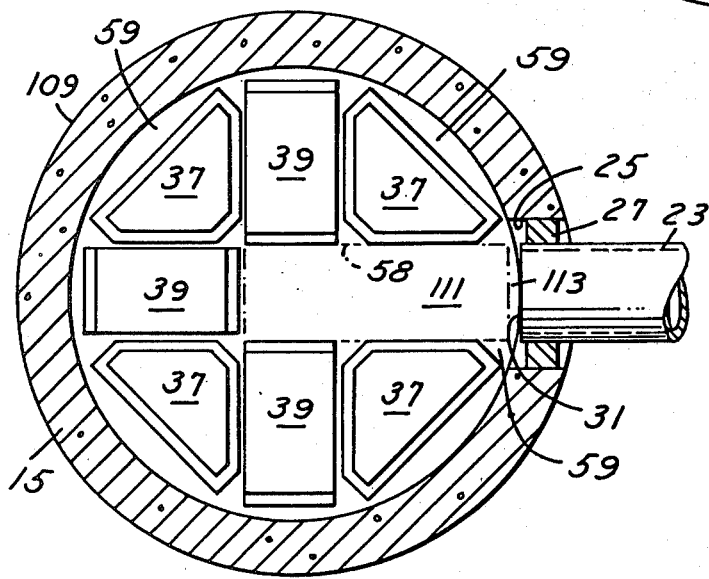
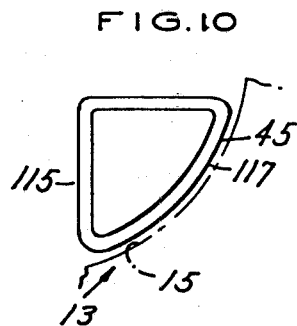

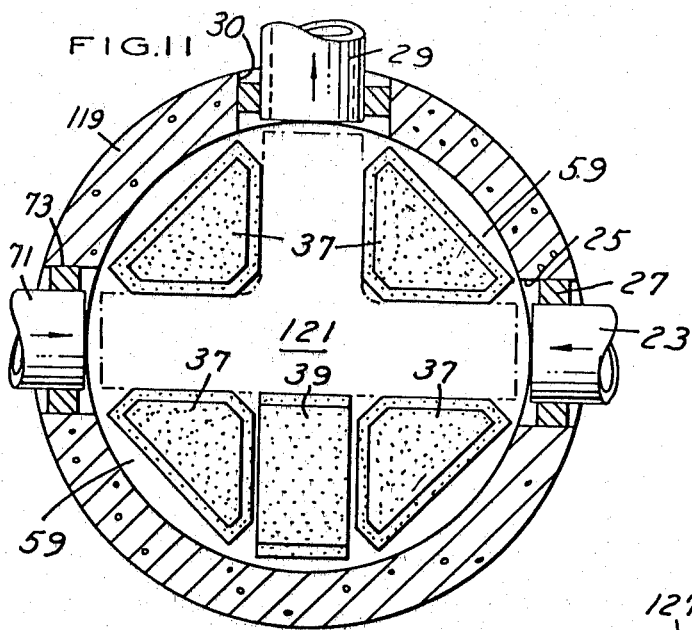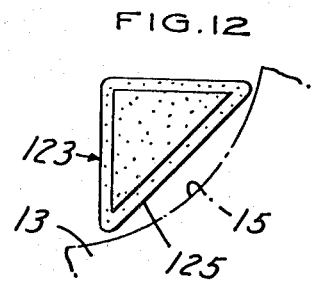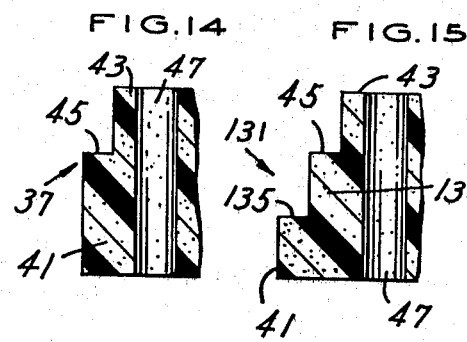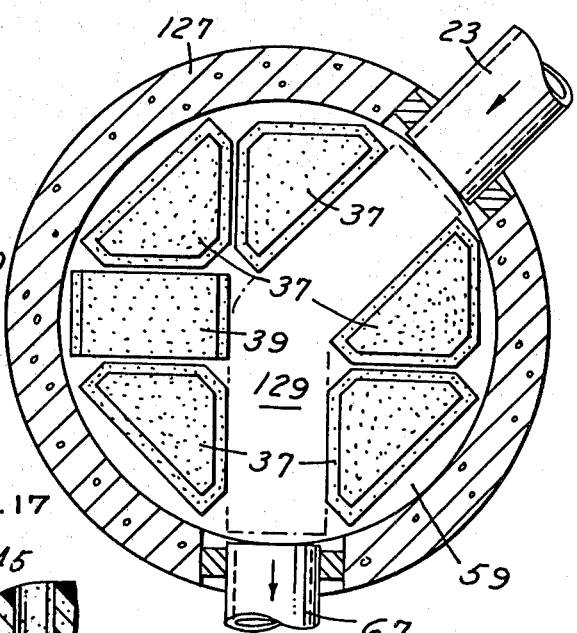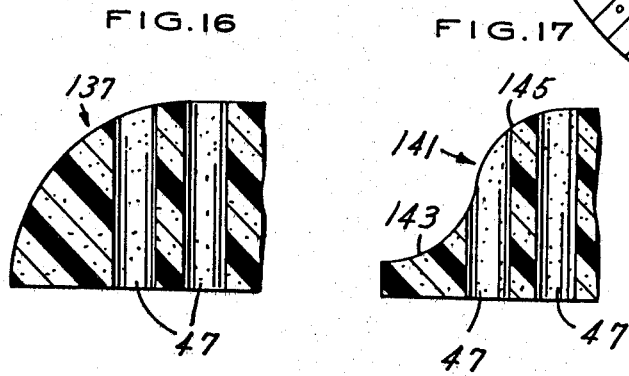

SEWER MANHOLE CHANNEL CONSTRUCTION AND METHOD

This is a continuation of application Ser. No. 129,362, filed Mar. 11, 1980, now U.S. Pat. No. 4,341,236.

BACKGROUND OF THE INVENTION

Sewer manholes are openings through the street surface to a sewer to provide easier inspection and cleaning. They are placed usually at intervals of 300 to 500 feet and a straight line portion of the sewer extends between a pair of adjacent manholes. Manholes are usually circular in plan, having a cast-iron opening in the street surface which is covered with a corrugated cast-iron cover. Usually the manhole enlarges to about 4 feet in diameter and continues at this diameter down to the sewer elevation. This provides ample space for cleaning or unstopping the sewer with the conventional segmented sewer rods commonly used. The sewage is carried through the manhole floor in channels in the floor with the depth of the channels from ½ of the sewer diameter up to the full diameter of the sewer ends which extend into the manhole.

In some constructions sewer manholes are poured concrete and in other constructions and as shown in the preferred embodiment consist of a series of cylindrical reinforced concrete sections having cooperating annular portions and grooves to provide an upright cylinder and including a cylindrical bottom section which includes bottom and circular side walls.

Heretofore, to provide a flooring for the bottom section of the manhole which is spaced below sewer conduits a quantity of concrete is normally poured which extends from the bottom of the section up to and adjacent the side wall openings which receive the sewer conduits. Conventionally a U-shaped channel is formed in the top surface of the flooring which communicates with respective inlet and outlet or a plurality of inlets and outlets so that sewage from the sewer conduits flows through the channels in the bottom of the flooring directly through the manhole construction and outwardly thereof.

Examples of manhole constructions are shown in the following U.S. Pat. Nos.: 4,102,088; 4,127,990; 2,166,632; 3,276,176.

These patents are identified merely as showing the various types of sewer manhole constructions.

SUMMARY OF THE INVENTION

An important feature of the invention is that in the formation of the concrete flooring for the bottom section of a manhole construction there is first loosely positioned upon the bottom wall of the bottom section a plurality of pre-formed channel elements of polygonal shape and of plastic material and of a uniform height. These are mounted upon and around the bottom wall and adjacent to the side wall.

It is a further feature to arrange the channel elements so as to define a first channel which extends between the wall inlets and outlets and wherein the channel elements have a plurality of upright apertures extending therethrough.

The flooring is completed by the pouring of concrete over the filler channel elements filling all of the apertures in the channel elements and the interstices between the channel elements and between the channel elements and the side wall and further filling the first channel so as to overlie the channel elements and to provide a flooring above the channel elements. A concave floor channel is formed in the top of the concrete floor lining, and is in registry with the first channel and at its ends communicates with the inlet and outlet openings.

It is a further feature of the present invention to provide as a part of the flooring for the cylindrical bottom section of a sewer manhole a series of pre-formed channel elements of polygonal shape and of a porous plastic material filling a substantial portion of the space over the bottom wall of the bottom section and with the flooring completed by the pouring thereover of a layer of concrete which fills all of the apertures in the channel elements and fills the interstices between the channel elements and between the channel elements and the side walls and partly fills the primary channel defined by adjacent walls of the channel element.

It is a further feature of the invention to provide a plurality of pre-formed channel elements of polygonal shape such as triangular and rectangular for illustration, of a plastic material preferably a foam plastic material and of a uniform height. These channel elements have upright side walls which define a general passageway in the flooring in registry with the inlet and outlet openings receiving sewer connections.

It is a further feature to provide as a part of the flooring a series of cylindrical columns of concrete which fill the apertures of the respective channel elements and which extend to a layer of concrete which overlies the channel elements to complete the top surface of the flooring as a unit structure.

It is a further feature of the present invention, by the use of the properly shaped and properly positioned and located channel elements to define a filler within the flooring so that only 20% of the concrete is needed as heretofore required to form such flooring.

These and other objects will be seen from the following specification and claims in conjunction with the appended drawings in which:

THE DRAWINGS

FIG. 5 is a plan section similar to FIG. 2 illustrating a four-way manhole employing four spaced channel elements.

FIG. 6 is a plan view of a modified form of channel element located with respect to the side wall of the manhole fragmentarily shown.

FIG. 7 is a plan section similar to FIG. 5 showing a straight through manhole which includes six channel elements.

FIG. 8 is a fragmentary plan view of a modified form of channel element with its straight side adjacent the inner wall of the manhole, fragmentarily shown.

FIG. 9 is a plan section similar to FIG. 7 illustrating a dead-end manhole and employing seven channel elements.

FIG. 10 is a plan view of a modified channel element of triangular shape with rounded corners spaced with respect to an adjacent manhole wall, fragmentarily shown.

FIG. 11 is a plan section similar to FIG. 9 illustrating a three-way manhole and employing five channel elements.

FIG. 12 is a plan view of a different form of channel element of triangular shape with one straight side spaced adjacent the manhole side wall fragmentarily shown.

FIG. 13 is a plan section similar to FIG. 11 showing a bend in a manhole channel and employing six channel elements.

FIG. 14 is a fragmentary vertical section of the channel element of FIGS. 3 or 4.

FIG. 15 is a fragmentary vertical section of a modified cross-section showing a pair of spaced inset ledges.

FIG. 16 is a fragmentary vertical section of a modified channel element having a convex outer surface.

FIG. 17 is a fragmentary section of a modified channel element which includes a lower concave portion and an upper concave portion.

It will be understood that the above drawings illustrate merely preferred embodiments of the invention, and that other embodiments are contemplated within the scope of the claims hereafter set forth.

DESCRIPTION OF AN EMBODIMENT OF THE INVENTION

Figure 1:
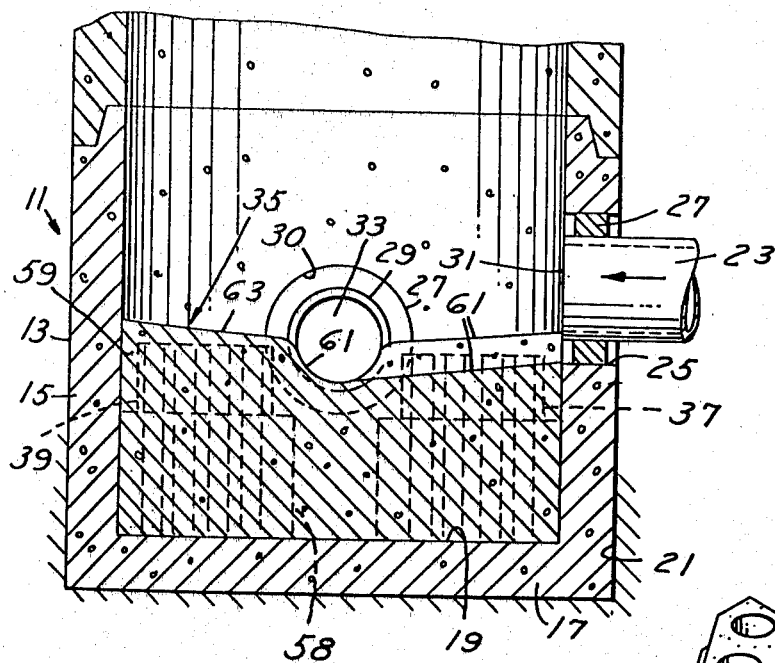
FIG. 1 is a fragmentary vertical section of a manhole construction having a cylindrical bottom section adapted to receive the ends of sewer conduits, taken in the direction of arrows 1—1 of FIG. 2.

Referring to the drawings FIGS. 1, 2, 3 and 4, a manhole construction generally indicated at 11 which has a cylindrical bottom section 13 of concrete having an annular side wall 15 and a bottom wall 17. The sewer manhole including a series of aligned interlocked concrete sections such as shown in FIG. 1 is adapted for placement within the ground upon the excavated ground surface 19, and with respect to the wall 21 of a filled hole forming a part of the excavation.

A portion of a first sewer pipe 23 is fragmentarily shown as extending loosely into and through the wall 15 within an inlet opening 25 therein and sealed with respect to the wall opening by an annular flexible seal 27 of suitable material such as PVC or other plastic sealer. A second sewer pipe fragmentarily shown at 29, FIG. 2, extends through a second outlet opening 30 within wall 15 and is suitably sealed therein as at 27.

First sewer pipe 23 has an inlet 31 upon the interior of the bottom section 15 and the second sewer pipe 29 has an outlet opening 33 which communicates with the interior of the bottom section 13. Both of the openings 25 and 30 are normally spaced above the bottom wall 17 and with respect to the present floor assembly 35.

A flooring is provided upon the bottom wall 17 and which includes a series of pre-located pre-formed channel elements 37 and 39 of polygonal shape and of a plastic material and of uniform height. These channel elements are of a lightweight pourous construction normally made of a foam plastic construction or a styrofoam and are mounted upon and around the bottom wall 17 and adjacent the side wall 15 in the manner shown in FIG. 2. The channel elements are loosely spaced upon the bottom wall side-to-side or edge-to-edge so that an inner wall of some of the elements is aligned with the inner wall of adjacent elements and is spaced from the inner wall of other opposed elements to define a first channel which underlies and extends between the inlet and outlet openings 25 and 30.

Channel element 37 has a base portion 41 of triangular shape and a top portion 43 also of triangular shape which at its sides is inset from the sides of the base portion to define the continuous ledge 45 between the base and top portions.

A series of spaced bores 47, preferably cylindrical, extend through the channel elements 37 and 39. The triangular channel elements 37 have truncated corners 49 upon the base thereof and the corner portions of the top members are similarly truncated at 51. Thus the ledge 45 is continuous around the periphery of the channel element 37.

The second form of channel element 39 is generally rectangular, includes a base portion 53 and thereover an inset top portion 55 defining ledges 57 at opposite ends of the channel element.

Figure 2:
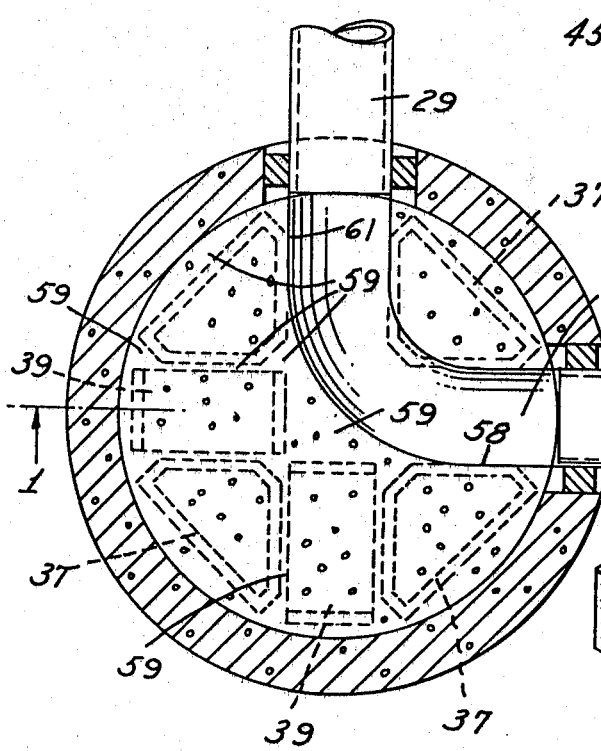
FIG. 2 is a plan sectional view thereof.

The channel elements are of lightweight porous plastic construction and are arranged loosely upon the bottom wall 17 of the bottom section as in FIGS. 1 and 2 closely spaced with respect to the side wall 15 and spaced with respect to each other. Thus one wall or corner of the respective pre-located channel elements together with opposing walls define first general channel 58 which extends between the inlet opening 25, FIG. 1, and the outlet opening 30. This first channel underlies and extends between said inlet and outlet openings.

The flooring is completed by a layer of concrete 59 which is poured into the bottom section, which fills the respective channel element apertures 47, fills the interstices between adjacent channel elements and the spaces between side walls of the channel elements and the corresponding wall 15 of the bottom section of the sewer manhole.

The concrete is poured to a depth so as to overlie the respective channel elements as shown in FIG. 1 and partly fills first channel 58 defined by the above cooperating sides of the channel elements.

Within the concrete fill 59, there is formed before it has hardened the elongated channel 61 generally concave in cross-section and extending to a height at least ½ the height of the sewer pipe inlets and outlets 31, 33.

In the illustrative embodiment the concave floor channel 61 overlies channel 58 defined by the adjacent aligned and opposed sides of the channel elements and provides a communicating passage which extends between the sewer pipes 23 and 29.

In the illustrative embodiment top edges of the open-top channel 61 extend up to at least ½ the height of the sewer pipes. It is contemplated that channel 61 could be of a height the same as the diameter of the sewer pipes 23, 29, fragmentarily shown, and which project into the cylindrical bottom section of the manhole and for passage of sewage through the manhole.

The top surface of the flooring is sloped as at 63 towards the floor channel 61 and provides a floor for a workman to stand for inspecting the sewer connections or employing tools for cleaning out blocked portions of either of the sewer pipes which project into the bottom section of the manhole.

By the use of the series of pre-located channel elements 37, 39 upon the bottom wall 17 a considerable amount of concrete is saved. It is estimated that approximately 20% concrete is all that is needed compared to the conventional construction wherein the flooring consisted entirely of concrete from the bottom wall 17 up to the sloped flooring at 63.

A modified manhole bottom section is designated at 65 in FIG. 5 which shows the corresponding sewer pipe 67 projecting into a corresponding inlet opening 69 and suitably sealed therein. A fourth sewer pipe 71, fragmentarily shown, extends through an additional spaced outlet or inlet opening 73 within walls 15 and is suitably sealed therein.

There are four channel elements 37 employed in the modification of FIG. 5 for the four-way passage manhole construction and wherein the basic channel 58 defined by inner walls of the channel elements is of cross-shape.

The floor channel shown at 75 is similarly of cross-shape, overlies channel 58 defined by the respective channel element, opens upwardly and provides communication between the inner ends of the respective sewer pipes to establish communication and the passage of sewage through the base of the manhole such as shown by the arrows, for illustration only.

A slightly modified form of channel element is designated at 77 in FIG. 6, of generally triangular shape but having a pair of outer wall portions 99 which extend at an obtuse angle to each other and are closely spaced with respect to the wall 15 of the manhole bottom section, fragmentarily shown.

A further modified manhole bottom section is designated at 101 in FIG. 7 of the straight pass-through type and wherein the respective sewer conduits 23 and 29 are in alignment. The communicating floor channel 103 is formed in the concrete flooring so as to extend between and communicate with the sewer pipe sections 23 and 29 for transmitting sewage through the channel 103 such as shown by the arrows. In this construction there are employed four channel elements 37 and a pair of opposed spaced channel elements 39 to define the straight line channel.

FIG. 8 shows in plan a modified shape of channel element 105 which has a generally semi-circular wall 107 and one flat wall 108 which is spaced adjacent to the side wall 15 of the bottom section 13 which is fragmentarily shown.

FIG. 9 is a similar plan section of a modified bottom section 109 referred to as a dead-end manhole since there is no passage therethrough. In this case there is a single inlet aperture 25 in the side wall 15. The end of sewer pipe 23 projects through aperture 25 and is sealed therein at 27.

A series of seven spaced channel elements of both types 37 and 39 are arranged in a convenient manner upon the bottom wall 17 of the cylindrical bottom section so that their sides generally define a channel 58 which extends radially of and communicates with sewer pipe 23. On completion of the flooring with the pouring of the concrete 59 over the pre-arranged channel elements there is formed in the top surface thereof the upwardly opening straight U-shaped channel 111 which extends substantially past the center of the manhole section and communicates with the outlet 31 of sewer pipe 23. There could be a removable plug 113 applied to the inlet end of the sewer pipe 23, if desired. It can be assumed that in use normally the dead-end manhole is provided for connection to the sewer pipe 23 but that sewage normally is not passing therethrough.

FIG. 10 is a fragmentary plan view of a slightly modified triangularly shaped channel element 115 with rounded corners and having an arcuate wall 117 which is spaced closely with respect to the side wall 15 of the bottom section 13, which is fragmentarily shown. This channel element nevertheless has the inset top portion to define the peripheral ledge 45 the same as above-described with respect to channel element 37.

A slightly modified cylindrical bottom section for a manhole construction is shown at 119 in FIG. 11 which is in the form of a three-way manhole construction.

In this arrangement of the flooring for the manhole bottom section there are employed four triangularly shaped channel elements 37 and a single rectangular channel element 39 so that there is defined in the top surface of the concrete flooring the channel 121 of T-shape adapted for registry with the respective sewer pipe segments shown at 23, 29 and 71.

A modified channel element 123 is shown in plan in FIG. 12, of triangular shape and wherein the hypotenuse side 125 is closely spaced with respect to the wall 15 of the bottom section 13, fragmentarily shown.

A modified bottom section is further shown at 127 in FIG. 13 to define a bend in the sewer pipe connections designated by the channel 129 which is formed in the floor surface. This includes the series of six channel elements five being triangular shape at 37 and one being rectangular shape at 39. These define generally the obtuse angle in the floor channel 129 which is formed for the passage through the manhole between the obtuse angularly related pipe sections 23 and 67.

Figure 3:
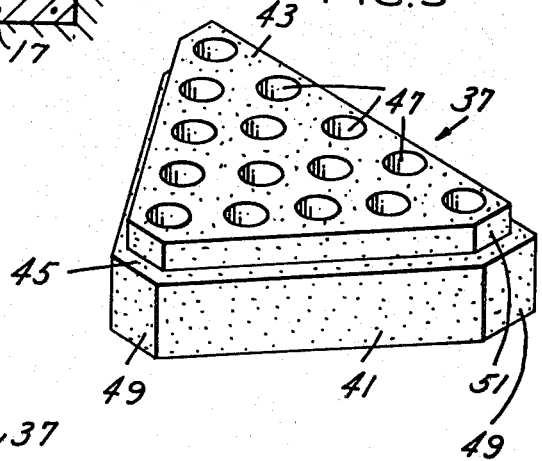
FIG. 3 is a perspective view of one of the pre-formed channel elements.
Figure 4:
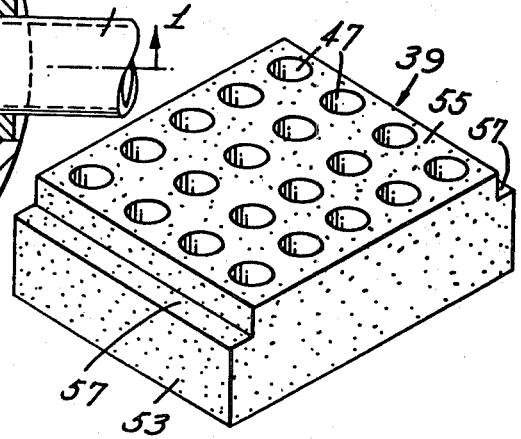
FIG. 4 is a perspective view of another of the pre-formed channel elements.

FIG. 14 is a fragmentary vertical section of the channel element 37 of FIG. 3 which includes bottom portion 41 and the inset top portion 43 defining the ledge 45 as further shown in FIG. 3.

A modified channel element is shown at 131 in FIG. 15 and in vertical cross-section has in addition to the bottom portion 41 and the top portion 43 the intermediate and inset portion 130 defining an intermediate ledge 135.

In the pouring of the flooring 59 over the assembled channel elements the poured concrete is adapted for cooperative registry with ledge 45 or the series of ledges 45 and 135.

FIG. 16 fragmentarily shows in vertical section a slightly different form of channel element which has an exterior surface which is convex as shown at 137.

A further modified vertical section of channel element is shown at 141 which includes the lower concave surface 143 and the merging top convex surface 145. FIGS. 15, 16 and 17 are merely illustrative of different cross-sectional shapes which the filler channel elements may employ.

The primary function of the respective pre-formed channel elements as they are assembled upon the base 17 of the bottom section of the manhole is to serve as fillers to occupy space and at the same time define the basic channel 58 to establish communication between at least a pair of sewer conduits or a plurality of sewer conduits.

The flooring which is poured into the cylindrical bottom section fills the apertures 47 in the respective elements, fills the interstices between the respective elements and the spaces between the elements and the wall of the bottom section and further overlies the assembled group of channel elements to complete the flooring such as shown at 35 in FIG. 1. The respective communicating upwardly opening channel is formed in the top surface of the flooring so as to establish fluid communication between the respective inlets and outlets of the corresponding sewer pipes.

The pre-formed channel elements 37 and 39 may be made from any suitable material such as precast concrete, aluminum, etc., in addition to the plastic and styrofoam materials mentioned previously. The material utilized must withstand the loads and forces encountered in a manhole.

Having described my invention reference should now be had to the following claims.

I claim:

1. In a sewer manhole construction having a cylindrical bottom section adapted for placement within the ground at a pre-determined depth, and having bottom and side walls;

there being spaced inlet and outlet openings in said side wall above said bottom wall adapted to receive the ends of sewer conduits;

the improvement comprising a flooring upon said bottom wall, said flooring including a plurality of pre-formed channel elements of generally triangular shape and of uniform height, said pre-formed elements being made from a light weight foam plastic material and being mounted upon and around said bottom wall adjacent said side wall, one inner wall of each element registering with the inner walls of adjacent elements and spaced from the inner wall of opposed elements to generally define a first channel underlying and interconnecting said inlet and outlet openings;

each generally triangular channel element having a base portion and a top portion inset along its sides from the sides of the base portion to define a continuous ledge around said generally triangular channel element between said base and top portions with the corners of the base and top portions being generally truncated;

each channel element having a plurality of upright apertures extending therethrough;

and a layer of concrete filling all of said apertures and the interstices between the channel elements and between the channel elements and side wall, partly filling said first channel and overlying said channel elements providing a flooring above the channel elements, the concrete filling the channel element apertures for defining a series of concrete columns within said channel elements and terminating in the top of the flooring above the channel elements;

there being a concave floor channel formed in the top of said concrete flooring in registry with said first channel and at its ends communicating with said inlet and outlet openings.

2. In the manhole construction of claim 1, said floor channel at one end being of a height at least ½ the diameter of the adjacent sewer conduit end.

3. In the manhole construction of claim 1, said floor channel being of a height at least ½ the height of the adjacent sewer conduit ends.

4. In the manhole construction of claim 1, said sewer conduit ends projecting through said inlet and outlet respectively, and sealing means between said conduit ends and side wall.

5. In the manhole construction of claim 1, there being four inlet and outlet openings spaced around said side wall;

each receiving an end of a sewer conduit, the channel elements being spaced with their sides and corners arranged to define a first channel of cross-shape, the concrete floor channel being similarly shaped.

6. In the manhole construction of claim 1, said channel elements having a base portion, an inset intermediate portion defining a first ledge and a top portion inset from the intermediate portion defining a second ledge.

7. In a dead-end sewer manhole construction having a cylindrical bottom section adapted for placement within the ground at a predetermined depth, and having bottom and side walls;

there being an inlet opening in said side wall above said bottom wall adapted to receive the end of a sewer conduit;

the improvement comprising a flooring upon said bottom wall, said flooring including a plurality of pre-formed channel elements of generally triangular shape and of uniform height, said pre-formed elements being made from a light weight foam plastic material and being mounted upon and around said bottom wall adjacent said side wall, one inner wall of each element registering with the inner walls of adjacent elements and spaced from the inner wall of opposed elements to generally define a first radial channel underlying said inlet opening;

each generally triangular channel element having a base portion and a top portion inset along its sides from the sides of the base portion to define a continuous ledge around said generally triangular channel element between said base and top portions with the corners of the base and top portions being generally truncated;

each channel element having a plurality of upright apertures extending therethrough;

and a layer of concrete filling all of said apertures and the interstices between the channel elements and between the channel elements and side wall, partly filling said first channel and overlying said channel elements providing a flooring above the channel elements, the concrete filling the channel element apertures for defining a series of concrete columns within said channel elements and terminating in the top of the flooring above the channel elements;

there being a concave floor channel formed in the top of said concrete flooring in registry with said first channel and at one end communicating with said inlet.

* * * * *